(No Model.)
B. B. REED.
LANDSIDE CUTTER FOR PLOWS.
No. 349,406. Patented Sept. 21, 1886.
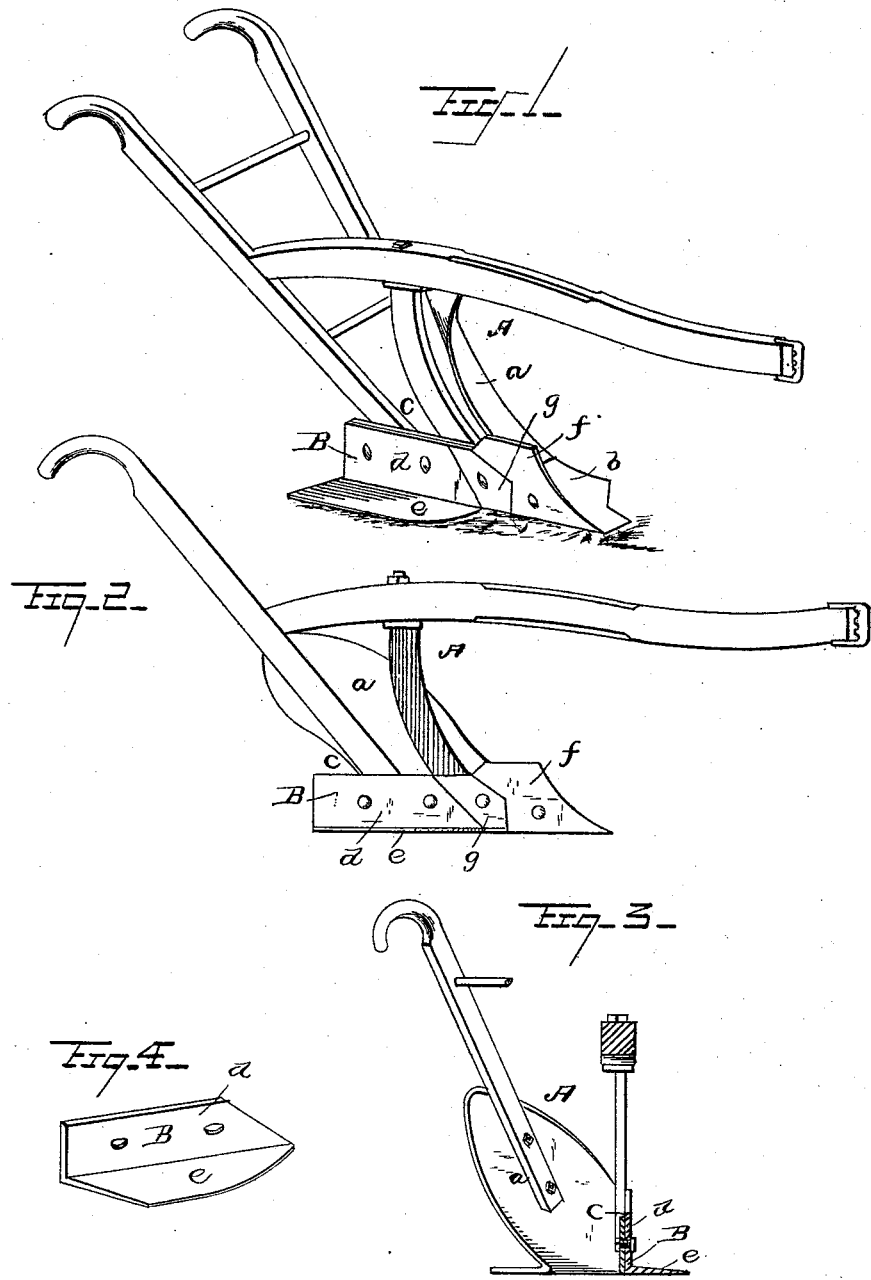

UNITED STATES PATENT OFFICE.

BENJAMIN B. REED, OF FORESTBURG, TEXAS.

LANDSIDE-CUTTER FOR PLOWS.

SPECIFICATION forming part of Letters Patent No. 349,406, dated September 21, 1886.

Application filed May 25, 1886. Serial No. 203,243. (No model.)

*To all whom it may concern:*

Be it known that I, BENJAMIN B. REED, a citizen of the United States, residing at Forestburg, in the county of Montague and State of Texas, have invented a new and useful Improvement in Landside-Cutters for Plows, of which the following is a specification.

My invention relates to an improvement in landside-cutters for plows; and it consists in the peculiar construction and arrangement of devices that will be more fully set forth hereinafter, and particularly pointed out in the claims.

In the drawings, Figure 1 is a perspective view of a plow provided with my attachment. Fig. 2 is an elevation of the same. Fig. 3 is a rear elevation, partly in section. Fig. 4 is a detail perspective view of my landside-cutter.

A represents the plow, of the usual construction, of which $a$ represents the mold-board, $b$ represents the point or share, and $c$ represents the landside. In a plow thus constructed the resistance of the earth when the plow is in operation is entirely upon the mold-board side, thereby giving the plow a tendency to turn diagonally in the furrow, and imposing upon the plowman the necessity of keeping the plow straight by grasping the handles, and also greatly adding to the draft of the plow. To avoid these objections, I provide an attachment, B, which is formed of a metallic plate bent to form a vertical side, $d$, and a horizontal outwardly-projecting wing or cutter, $e$, which extends from the lower side of the side $d$. This cutter or wing has its front edge beveled or rounded, as shown, and its vertical side $d$ is bolted to the landside of the plow, as shown. In Fig. 2 I show a colter, $f$, which is also bolted to the landside of the plow and projects beyond the front edge of the mold-board. The space between the rear edge of the colter and the front edge of the vertical side $d$ of the landside attachment is filled by a plate, $g$. If preferred, the colter may be formed in a single piece with the landside attachment, or the latter may be constructed and used without the colter.

When the plow is in operation, the wing $e$ enters the landside of the furrow on the same plane with the bottom thereof, and thus cuts into the landside side of the furrow beneath the turf, thus loosening and cutting the ground preparatory to the action of the share and mold-board in plowing the succeeding furrow and adding greatly to the efficiency of the plow and lessening its draft. The resistance offered to the landside-cutter partly compensates for the excessive strain on the mold-board, and thus causes the plow to run more smoothly and evenly in the furrow and neutralizes the tendency of the plow to turn diagonally in the furrow, as before pointed out.

Having thus described my invention, I claim—

1. The combination, with a plow, of the colter $f$ and the landside attachment B, secured to the landside of the plow, the said landside attachment B having the laterally-extending cutting-wing $e$, substantially as described.

2. The combination, with a plow, of the landside attachment having the lateral horizontal blade or wing $e$, the plate $g$ in front of the landside attachment, and the colter $f$ on the front edge of the said plate, substantially as described.

In testimony that I claim the foregoing as my own I have hereto affixed my signature in presence of two witnesses.

BENJAMIN B. REED.

Witnesses:
J. W. BOWERS,
N. D. BARRETT.